United States Patent [19]
Hegler et al.

[11] Patent Number: 5,511,964
[45] Date of Patent: Apr. 30, 1996

[54] APPARATUS FOR THE PRODUCTION OF PLASTIC PIPES

[75] Inventors: Ralph-Peter Hegler; Wilhelm Hegler, both of Bad Kissingen, Germany

[73] Assignee: Wilhelm Hegler, Germany

[21] Appl. No.: 847,637

[22] Filed: Mar. 6, 1992

[30] Foreign Application Priority Data

Apr. 8, 1991 [DE] Germany .................. 41 11 229.6

[51] Int. Cl.$^6$ .................................................. B29C 47/90
[52] U.S. Cl. ............................. 425/326.1; 264/209.3; 264/210.5; 264/286; 264/508; 264/511; 264/514; 264/519; 264/565; 264/566; 264/568; 264/171.26; 425/133.1; 425/336; 425/369; 425/381; 425/384; 425/387.1; 425/388; 425/392; 425/393; 425/395; 425/396; 425/403; 425/464; 425/466; 425/467
[58] Field of Search ................ 425/133.1, 326.1, 425/381, 336, 369, 378.1, 406, 384, 324.1, 463, 464, 466, 467, 71, 387.1, 388, 380, 392, 393, 395, 396, 403; 264/209.4, 209.7, 560, 565, 508, 511, 514, 519, 566, 568, 173, 209.3, 210.5, 286

[56] References Cited

U.S. PATENT DOCUMENTS

| | | | |
|---|---|---|---|
| 3,057,013 | 10/1962 | Loveless | 425/71 |
| 3,609,809 | 10/1971 | Slicker | 264/209.7 |
| 3,677,676 | 7/1972 | Hegler | 425/133.1 |
| 3,907,961 | 9/1975 | Carrow | 425/71 |
| 3,981,663 | 9/1976 | Lupke | 425/326.1 |
| 3,994,646 | 11/1976 | Hauck | 425/133.1 |
| 3,998,579 | 12/1976 | Nordstrom | 425/369 |
| 4,199,314 | 4/1980 | Lupke et al. | 425/326.1 |
| 4,365,948 | 12/1982 | Chaplain | 425/336 |
| 4,402,898 | 9/1983 | Rosenbaum | 425/133.1 |
| 4,439,130 | 3/1984 | Dickhut et al. | 425/326.1 |
| 4,510,013 | 4/1985 | Lupke et al. | 425/378.1 |
| 4,534,923 | 8/1985 | Lupke | 425/133.1 |
| 4,545,751 | 10/1985 | Lupke | 425/326.1 |
| 4,663,107 | 5/1987 | Takada et al. | 425/326.1 |
| 4,698,196 | 10/1987 | Fabian | 425/326.1 |
| 4,717,324 | 1/1988 | Schad et al. | 425/133.1 |
| 4,770,618 | 9/1988 | Lupke | 425/133.1 |
| 4,789,327 | 12/1988 | Chan et al. | 425/133.1 |
| 4,790,975 | 12/1988 | Jaruenkyla et al. | 425/133.1 |
| 4,808,098 | 2/1989 | Chan et al. | 425/133.1 |
| 4,867,928 | 9/1989 | Jaruenkyla et al. | 425/326.1 |
| 4,995,800 | 2/1991 | Lupke | 425/133.1 |
| 5,062,782 | 11/1991 | Tompkins et al. | 425/133.1 |
| 5,123,827 | 6/1992 | Lupke | 425/133.1 |
| 5,132,062 | 7/1992 | Brambilla | 264/209.7 |
| 5,186,878 | 2/1993 | Lupke | 264/209.4 |
| 5,296,188 | 3/1994 | Lupke | 264/209.4 |

FOREIGN PATENT DOCUMENTS

2362444 6/1975 Germany.

Primary Examiner—Jay H. Woo
Assistant Examiner—Joseph Leyson
Attorney, Agent, or Firm—Laff, Whitesel, Conte & Saret, Ltd.

[57] ABSTRACT

An apparatus for the manufacturing of plastic pipes has half shells of which two at a time combine as a pair to form a mold. It is provided with a temperature-regulating bell. Supply lines are formed as flexible supply hoses of temperature-resistant plastic material. A line conduit accommodating them is provided with a protecting tube, which accommodates the supply hoses and which is provided with a heat insulation towards an injection head.

7 Claims, 3 Drawing Sheets

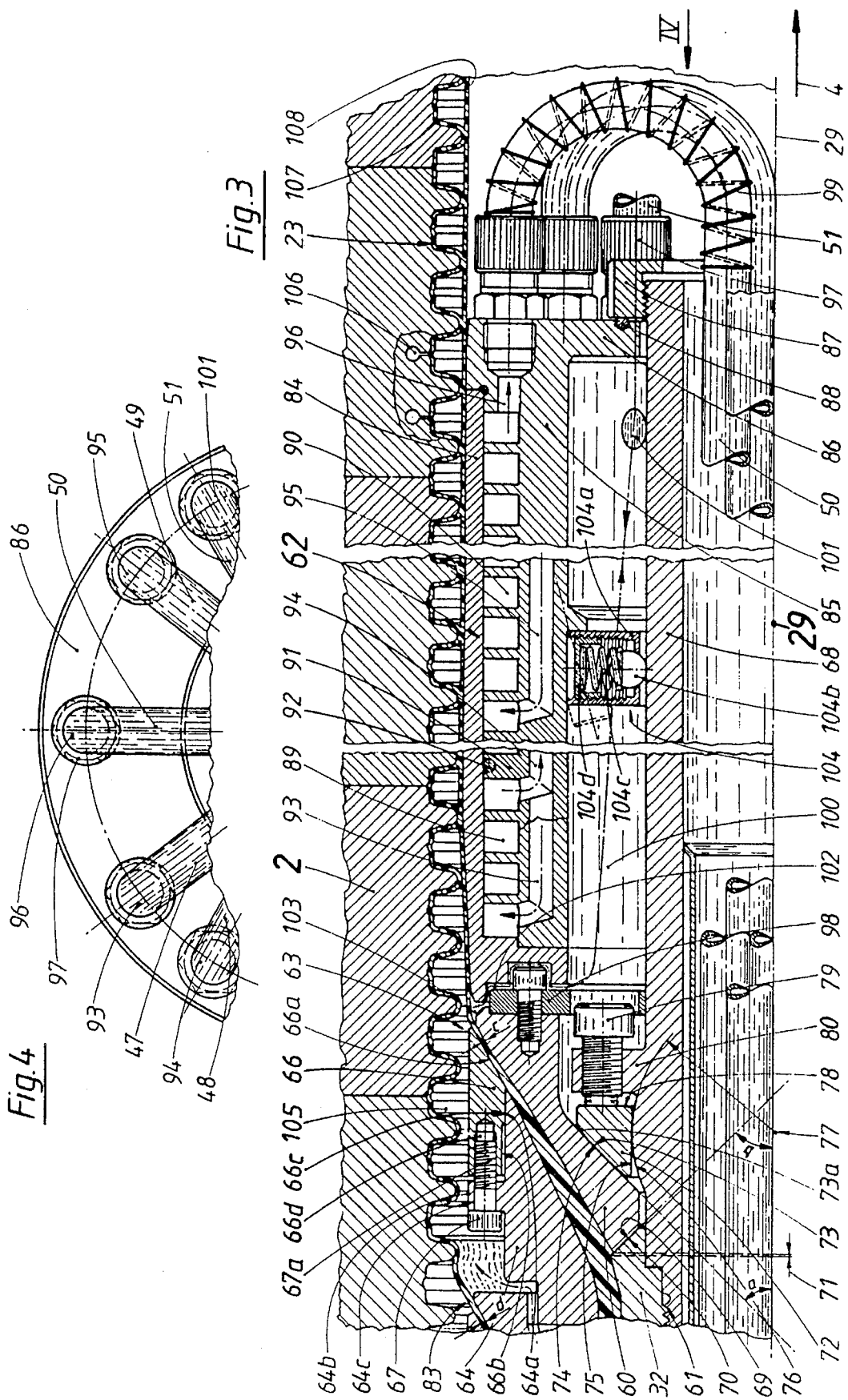

5,511,964

APPARATUS FOR THE PRODUCTION OF PLASTIC PIPES

FIELD OF THE INVENTION

The invention relates to an apparatus for the production of plastic pipes having a plurality of half shells, of which each is provided with a mold recess and of which two at a time combine as a pair on a molding path to form a mold surrounding a mold space with a central longitudinal axis, and which half shells are arranged on a machine bed to be circuit-guided and to form said mold when guided in a direction of production, an injection head of an extruder being arranged upstream of the molding path, the injection head being provided at its rear end seen in the direction of production with a temperature-regulating bell, which is provided with a cooling channel, the injection head being provided with a line conduit extending concentrically of said central longitudinal axis and also passing through the temperature-regulating bell, and two supply lines being connected to the cooling channel and arranged in the line conduit.

BACKGROUND OF THE INVENTION

An apparatus of the generic type known from DE 23 42 444 A1 serves for manufacturing corrugated pipes. To this effect two supply lines are provided in a line conduit of the injection head, which—seen in the direction of production—are bent over at the rear end of the temperature-regulating bell and connected frontally to a coolant flow pipe and a coolant return pipe, respectively, of a cooling channel. This embodiment with two rigid supply pipes is rather inflexible.

SUMMARY OF THE INVENTION

It is an object of the invention to embody an apparatus of the generic type such that it can very flexibly be equipped with supply lines without the thermal conditions within the injection head being substantially influenced.

This object is attained by the features that the supply lines are formed as flexible supply hoses of temperature-resistant plastic material and that the line conduit is provided with a protecting tube, which accommodates the supply hoses and which is provided with a heat insulation towards the injection head. Due to the supply lines being formed as flexible supply hoses a varying number of supply hoses for various requirements can easily—and even subsequently— be arranged in the line conduit. The supply hoses do not need any special retaining means in the supply conduit, so that they are substantially free thus being mainly surrounded by the air, whereby a first heat insulation is created. Since the line conduit is defined by a protection tube in turn provided with a heat insulation towards the injection head, further heat transfer resistances are generated, so that the temperature conditions within the injection head are virtually not influenced. The heat insulation between the protection tube and the injection head is preferably formed by an air gap.

The measures according to the invention are of advantage in apparatuses designed for the manufacturing of compound pipes. In this case two hoses of thermally plastic material are extrusion-molded from the injection head, which are drawn on the molding path in the mold space and connected with one another. In this case it is of particular advantage, when the hose forming an internal pipe is first heated on the temperature-regulating bell and cooled only afterwards. It is very simple to provide two further supply hoses for the heating channel. Furtheron, a further development is possible, namely in the case of the temperature-regulating bell also being provided with a pressure compensating channel. In this case a further supply hose may be provided. The supply hoses preferably consist of polytetrafluorethylene, since this plastic material is temperature-resistant. Especially in the case of an embodiment of the apparatus for the manufacturing of compound pipes with the supply of the injection head taking place by one extruder only, the measures according to the invention are of particular advantage.

Further features, details and advantages of the invention result from the ensuing description of an example of embodiment taken in conjunction with the drawing.

BRIEF DESCRIPTION OF THE DRAWING

FIG. 3 is a longitudinal section through a temperature-regulating bell arranged on the injection head, and FIG. 4 is a partial front view of the temperature-regulating bell according to the arrow IV of FIG. 3.

DESCRIPTION OF THE PREFERRED EMBODIMENT

Figure 1:
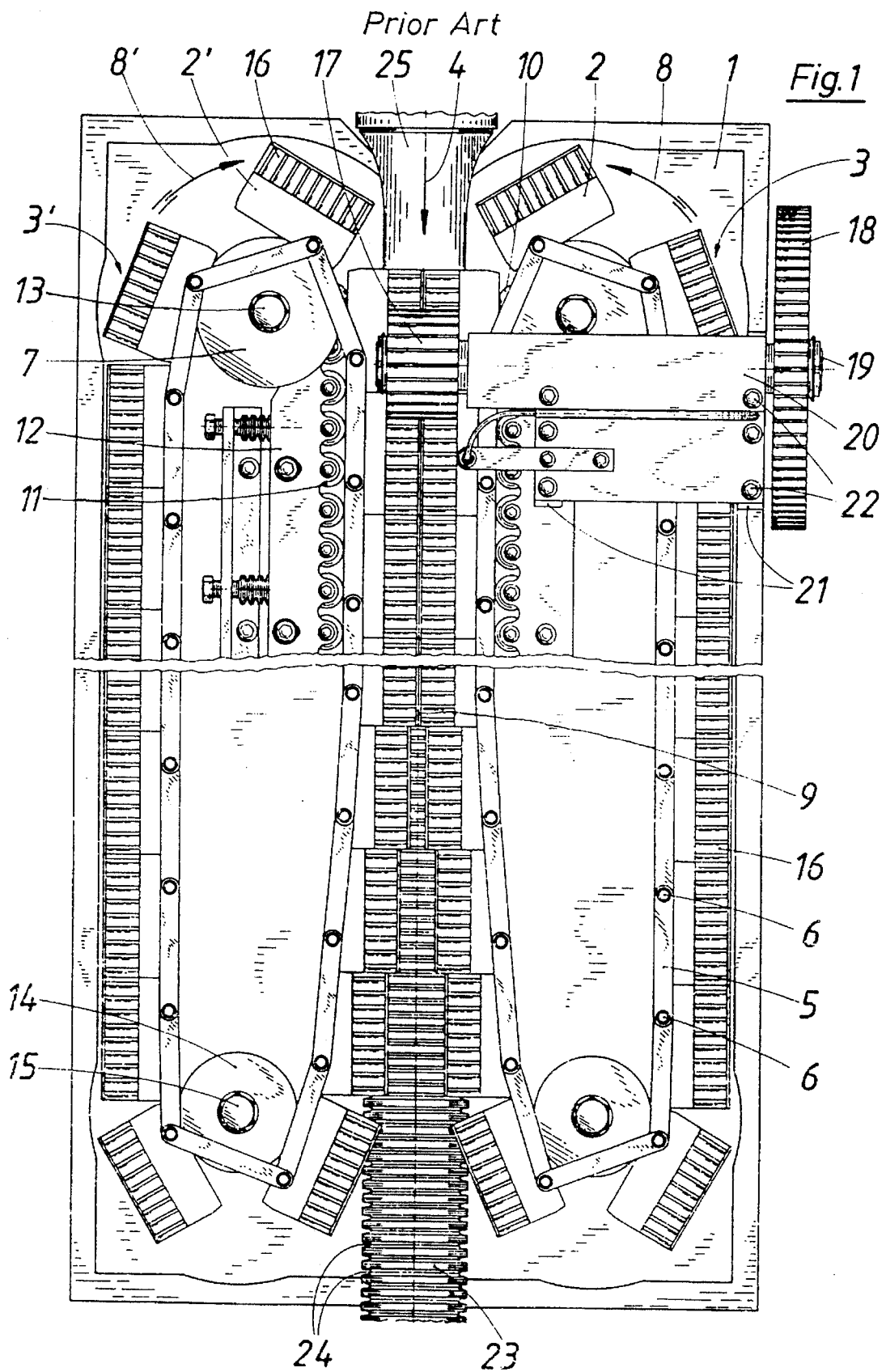
FIG. 1 is a plan view of an apparatus for manufacturing plastic pipes.

As seen in FIG. 1, the apparatus for the production of plastic compound pipes with transverse grooves comprises a machine bed 1, on which half shells 2, 2' are arranged, which are joined together respectively in two so-called chains 3, 3'. For this purpose, a fish-plate 5 is coupled by means of a coupling bolt 6 to each half shell 2, 2' in the outer region thereof and downstream thereof with respect to the direction 4 of production, each fish-plate 5 being attached to the succeeding half shell 2, 2' at the corresponding position, likewise by means of another coupling bolt 6. The chains 3, 3' thus formed, at their rear end with respect to the direction 4 of production, are carried around guide wheels which serve as and may be designated feed rollers 7. The individual half shells 2, 2' are swung into a molding path 9 by the revolution of the chains 3, 3' in the direction of the arrows 8, 8'. In this path 9 two half shells 2, 2' at a time are united to a half shell pair, so that an unbroken succession of pairs of half shells mutually abut in the direction 4 of production. In order to achieve rapid closure of the half shells 2, 2' into a parallel and adjoining orientation, so-called closing rollers 10 are provided, which bring the rear ends of the half shells 2, 2', referred to the direction 4 of production, together in accelerated fashion.

In the molding path 9 itself, the mutually abutting half shells 2, 2' are pressed together by means of guide rollers 11, which are rotatably mounted in guide rails 12. The feed rollers 7 are rotatably mounted on the machine bed 1, referred to the direction 4 of production, return rollers 14, likewise serving as guide wheels, are rotatably mounted on axle bearings 15, around which the chains 3, 3' are guided and returned to the feed rollers 7. As can be seen in FIG. 1, the guide rails 12 with the guide rollers 11 terminate after the length of several half shells 2, 2' and before the return rollers 14, so that the half shells 2, 2' can be displaced away from each other transversely of the direction 4 of the production while remaining parallel to each other, before they are guided around the return rollers 14.

On the upper side of the half shells 2, 2' there is provided a set of teeth 16, and the two sets of teeth 16 of the half shells 2, 2' which are arranged in abutting pairs match each other, so that a common pinion 17 can engage in the teeth 16, and push the half shells 2, 2' along the molding path 9 as a closed mold. This drive pinion 17 is driven in conventional manner by a motor (not shown) through a drive gear wheel 18 which is fixedly mounted on a shaft 19, the shaft in turn carrying the drive pinion 17. The shaft 19 is housed in a bearing 20, which is set apart from the machine bed 1 by means of spacing pieces 21 and firmly fixed in relation to the machine bed 1 by means of screws 22.

In the illustrated apparatus, plastic pipes 23, namely so-called compound pipes, having among other things transverse profile features, i.e. with grooves 24 extending around their girth, are produced.

The pipes 23 will be described in detail in the following. For this purpose an extruder is provided, of which only the injection head 25 to be described in detail in the following is shown. The apparatus thus far described is known, for example, from U.S. Pat. No. 4 492 551 and from U.S. patent application 07/727,023.

The injection head 25 is secured to a connecting piece 27 of the extruder (not shown) by means of screws 26. It has a substantially ring-shaped nozzle body 28, to which all the essential parts of the injection head are secured. Concentrically of a common central longitudinal axis 29 of the injection head 25 this nozzle body has an annular collar 30 projecting in the direction 4 of production. An internal mandrel 32 is secured within this annular collar 30 by means of an internal thread connection 31. An external mandrel 34 is attached on the outer circumference of the annular collar 30 by means of an external thread connection 33. Finally and again concentrically of the axis 29, an external nozzle jacket 35 is attached to the nozzle body 28 by means of an adjusting ring 36 and by means of the screws 26.

Figure 2:
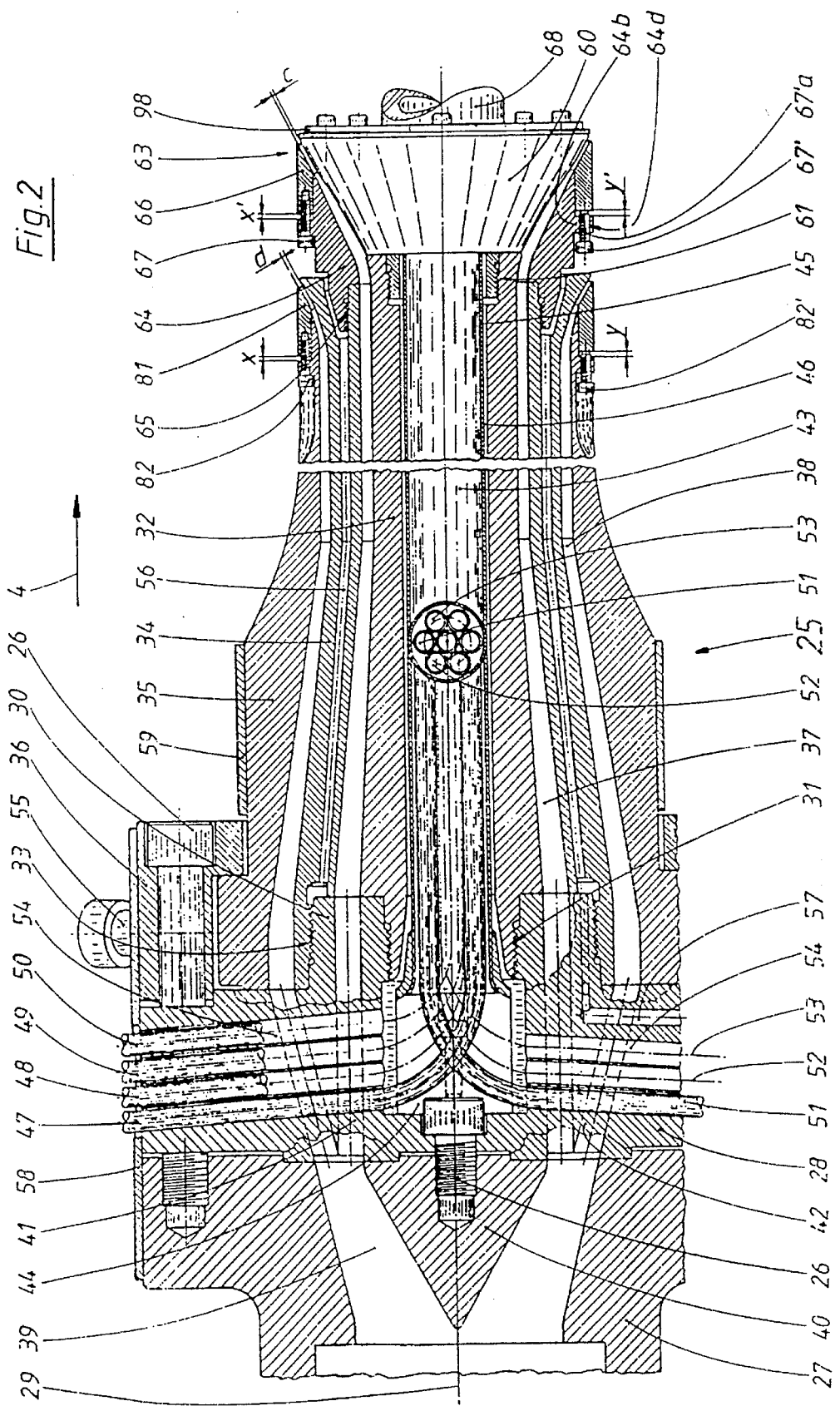
FIG. 2 is a vertical longitudinal section through the injection head of the apparatus.

The internal mandrel 32 and the external mandrel 34 define between them an internal channel 37, while the external mandrel 34 and the external nozzle jacket 35 define between them an external channel 38. The internal channel 37 and the external channel 38 are connected to an injection channel 39 coming from the extruder—as seen in FIG. 2. So as to attain a continuous flow of the plastic melt from the extruder into the channels 37, 38, a guide cone 40 is arranged on the nozzle body 28 and directed into the injection channel 39 against the direction 4 of production.

In the nozzle body 28 the internal channel 37 is interspersed by radially extending internal webs 41 and the external channel 38 is interspersed by external webs 42 equally extending radially relative to the axis 29, so that the nozzle body is really one piece. As can be seen from FIG. 2, the internal channel 37 in the nozzle body 28 extends through the annular collar 30.

The internal mandrel 32 is provided with a line conduit 43 extending concentrically of the axis 29 and opening into a chamber 44 in the nozzle body 28. In this line conduit 43 a protecting tube 45 is arranged concentrically of the axis 29 and is insulated towards the internal mandrel 32 by an air gap 46. The protecting tube 45 itself is made from steel.

Supply hoses 47, 48, 49, 50, 51, 52, 53 are piloted through the protecting tube 45 in the line conduit 43. They are guided radially from outwards through the nozzle body 28 into the latter's chamber 44, to which effect approximately radially extending bores 54 reaching right into the chamber 44 are provided which of course intersperse the external webs 42 and the internal webs 41, so that the hoses 47 to 53 do not contact the melt transported in the channels 37 and 38. The hoses 47 to 53 are made of high-temperature-resistant plastic material such as polytetrafluorethylene.

The external nozzle jacket 35 is oriented and arrested by means of adjusting screws 55 provided in the adjusting ring 36 and extending radially in relation to the axis 29. In the external mandrel 34 gas ducts 56 are formed extending in the direction 4 of production and connected to a supply channel 57 in the nozzle body 28, which extends approximately radially referred to the axis 29 and passes through the web 42. Along a major part of length the injection head 25 is surrounded by heaters 58, 59, so that a cooling down of the melt coming from the injection channel 39 and flowing through the channels 37, 38 be avoided.

The structure of the injection head 25 in the vicinity of its nozzles shown on the right in FIG. 2 is described in the following with simultaneous reference to FIG. 3. An internal mandrel disk 60 expanding in the shape of a truncated cone is arranged on the internal mandrel 32 by means of a thread connection 61 and bears an internal mandrel formed as a temperature-regulating bell 62. On the side located inwards radially of the axis 29 this internal mandrel disk 60 delimits an internal nozzle 63 finishing the internal channel 37. On the external mandrel an extension piece 64 is arranged by means of a thread connection 65 and, seen in the direction 4 of production, partially surrounds the internal mandrel disk 60, thus surrounding an extended portion of the internal channel 37 on the outside, namely as far as right ahead of the internal nozzle 63. On the side located radially outwards the latter is surrounded by means of an internal nozzle ring 66 arranged on the extension piece 64.

The internal nozzle ring 66 is in the form of a sleeve and has a nozzle limiting face 66a expanding in the shape of a truncated cone in the direction of production and delimiting the internal nozzle 63. Furthermore its approximately cylindrical inner face has a ring-shaped cutout 66b at the end facing away from the nozzle limiting face 66a, so that it bears on and is guided on a cylindrical guide surface 64a of the extension piece 64 of the external mandrel 34 only with a comparatively short cylindrical bearing surface 66c formed between the cutout 66b and the nozzle limiting face 66a. The length of the bearing surface 66c in the direction 4 of production is considerably less than its diameter. An abutment 64b projecting outwards is formed on the extension piece 64 following the guide surface 64a. In this abutment 64b and distributed along the circumference tension adjusting screws 67 and pressure adjusting screws 67' are alternately arranged. Such adjusting screws 67, 67' are suitably provided at angles of 45° along the circumference, i.e. a total of four in each case. The tension adjusting screw 67 shown on the top of FIGS. 2 and 3 is piloted in a bore 64c of the abutment 64b and screwed with a thread 67a into a threaded bore 66d of the internal nozzle ring 66. By means of this tension adjusting screw 67 the internal nozzle ring 66 can be displaced or tilted towards the abutment 64b.

The pressure adjusting screw 67' only shown in FIG. 2, bottom, has a thread 67'a that is screwed into a threaded bore 64d of the abutment 64b. By means of this pressure adjusting screw 67' the internal nozzle ring 66 can be pressed or tilted to move away from the abutment 64b towards the internal nozzle 63. Through common actuation of the adjusting screws 67 and 67' the gap between the abutment 64b and the internal nozzle ring 66 can thus have different widths x or y, respectively, along its circumference and consequently the internal nozzle ring 66 cannot only be adjusted in parallel to the central longitudinal axis 29 by setting the width c of the internal nozzle 63; it can also—even only to some minor extent—be tilted in relation to the axis 29, whereby the width c of the internal nozzle 63 differs along the circumference. Due to the bearing surface 66c being guided on the guide surface 64a only over a short distance, a clearance of some hundredths of a millimeter between the latter is sufficient to cause irregularities in the width c of some tenths of a millimeter along the circumference of the internal nozzle 63. Moreover steel is a material elastically deformable even at temperatures of 180° to 250° C.

The internal mandrel disk 60 is arranged on a suspension tube 68 extending concentrically of the axis 29 and which is connected with the internal mandrel 32 by means of the thread connection 61 mentioned. The internal mandrel disk 60 is supported on a corresponding conical seat surface 70 at the free end of the internal mandrel 32 by means of a conical surface 69. To some minor extent the internal mandrel disk 60 can be adjusted radially relative to the axis 29 on this conical seat surface, whereby an adjusting step 71 can be formed, which is by all means smaller than 1 mm, but does not exceed 0.5 mm as a rule. For adjusting the internal mandrel disk 60 a conical adjustment ring 72 is provided bearing with a conical surface 73 against a conical seat surface 74 on the inside of the internal mandrel disk 60. While the conical surface 69 and the conical seat surface 70 taper in the direction 4 of production, the conical surface 73 and the associated conical seat surface 74 expand in the direction 4 of production. With its cylindrical inner surface 75 the conical adjustment ring 72 is guided on a spherical ring-shaped guide surface 76 of which the center 77 is located on the axis 29. Pressure adjusting screws 79 bear against a working face 78 of the conical adjustment ring 72 facing away from the conical surface 73 and are adjustably guided in abutments 80 which are in turn tightly connected with the suspension tube 68. By individually setting the adjusting screws 79, of which only one is illustrated, the conical adjustment ring 72 can be tilted on the spherical guide surface 76 to some minor extent, so that the angle of inclination a of its conical surface 73 is not identical along the entire circumference of the conical adjustment ring. Thus the internal mandrel disk 60 is adjusted at its support by means of the conical surface 69 and excentrically of the axis 29 on the spherical guide surface 76. So as to have this take place to the extent desired the average inclination of the conical surface 73 relative to the axis 29 is 45°; in like manner the inclination b of the conical seat surface 70 referred to the axis 29 is approximately 45°. The conical surface 69 and the conical seat surface 74 are inclined one towards the other by an angle of 90°. To facilitate tilting the conical surface 73 can have inclinations 73a by 1° to 2° extending over 10 to 20% of its length at its external portions, which are impossible to be illustrated in the drawing.

By adjusting the internal nozzle ring 66 in the direction of the axis 29 the basic width c of the internal nozzle 63 and to some minor extent a width c varying along its circumference is set. Due to the described radial adjustment of the internal mandrel disk 60 the width c of the internal nozzle 63 is set to a major extent along its circumference. Thus the width c of the internal nozzle 63 can be adjusted to be exactly the same along its circumference. On the other hand it can also be adjusted to vary along its circumference.

The embodiment and arrangement and adjustment of the external nozzle ring 81 with its tension adjusting screws 82 and its pressure adjusting screws 82' is completely identical with that of the internal nozzle ring 66, for which reason reference is made to the description regarding the latter. While producing different widths x' and y' the width d of an external nozzle 83 finishing the external channel 38 can thus be adjusted, and that with a width d varying along the circumference.

The gas ducts 56 open out of the injection head 25 between the external nozzle 83 and the internal nozzle 63 located downstream in the direction 4 of production. The temperature-regulating bell has an essentially cylindrical calibrating cylinder 84 of usual structure. The latter is arranged on a temperature-regulating cylinder 85 supported on the suspension tube 68 with a clearance of 1 to 2 mm by means of a flange 86.

The temperature-regulating cylinder 85 is retained on the suspension tube 68 by means of a screwed connection 87 and is axially adjustable in the direction 4 of production. Sealing is attained by means of a seal 88. The temperature-regulating cylinder 85 has a heating channel 89 and a cooling channel 90 on its external circumference. Both channels 89, 90 extend helically on the external circumference of the temperature-regulating cylinder and are covered by the calibrating cylinder 84 towards the outside. Seen in the direction 4 of production the heating channel 89 comes first after the internal nozzle 63 and is followed by the cooling channel 90. The two helically extending channels 89, 90 are separated one from the other by an annular-land-type wall 91 bearing with a seal 92 against the calibrating cylinder 84.

By means of a heating medium flow pipe 93 extending parallel to the axis 29 in the temperature-regulating cylinder 85 the heating channel 89 is connected with the supply hose 47, through which the heating medium is supplied. In the vicinity of the internal mandrel disk 60 this flow pipe 93 opens into the heating channel 89—as seen in FIG. 3. The heating medium helically flows through this heating channel 89 in the direction 4 of production and leaves it through a heating medium return pipe 94 which is parallel to the flow pipe 93 in the temperature-regulating cylinder 85. The heating medium cooled down flows towards the supply hose 48. In like manner regarding the cooling channel 90 a coolant flow pipe 95 opens into the cooling channel 90 in the vicinity of the wall 91. The coolant flows helically through the cooling channel 90 in the direction 4 of production and leaves the latter through a coolant return pipe 96. Coolant supply takes place through the supply hose 49, while the return flow takes place through the supply hose 50. The supply hoses 47 to 50 are secured to the front of the flange 86 by means of usual screw connections 97.

A heat insulation 98 is arranged between the temperature-regulating bell 62 and the internal mandrel disk 60. As can be taken from FIG. 3, the supply hoses 47 to 53 can be surrounded by a helical spring 99 in particular in the strongly bent portion ahead of each screw connection 97.

The temperature-regulating cylinder 85 is hollow and, in its interior space, has a compensation chamber 100 surrounding the suspension tube 68. By way of a compensation channel 101 this compensation chamber 100 is connected with the supply hose 51 connected with the atmosphere for the purpose of vacuum and overpressure compensation. By way of a compensation gap 102 formed on the separating face between the internal mandrel disk 60 and the temperature-regulating bell 62 the compensation chamber 100 is connected with the mold space 103 formed between the half shells 2 and 2', respectively, and the injection head 25 with the temperature-regulating bell 62. The compensation gap 102 opens into the mold space 103 directly after the internal nozzle—seen in the direction 4 of production. A plurality of resilient radial bearings 104 are arranged in the compensation chamber 100 and uniformly distributed over its circumference. Each radial bearing 104 rests with a bearing housing 104a against the inner wall of the temperature-regulating cylinder 85, namely on the latter's center-of-gravity plane. It bears against the suspension tube 68 by means of a ball 104b. The latter bears in turn against a compression spring 104c supported against an abutment 104d adjustable in the bearing housing 104a.

The two further supply hoses 52, 53 may be provided for further supply purposes such as the supply of compressed air or release agents.

As seen in FIG. 3, ring-shaped mold recesses 105 connected in known manner to partial vacuum channels 106 are formed in the half shells, of which only the half shells 2 are shown.

The melt of plastic material supplied from the extruder through the injection channel 39 and only roughly outlined in FIG. 3 flows in part through the external channel 38 to the external nozzle 83, out of which a hose is extrusion-molded, which as a result of the partial vacuum settles in the mold recesses 105 while forming a hose provided with transverse grooves 24. It forms the external pipe 107 of the pipe 23.

Another part of the melt flows through the internal channel 37 towards the internal nozzle 63, out of which exits a further hose onto the calibrating cylinder 84. The latter slightly expands from the internal nozzle 63 outwards in the direction 4 of production, until this hose comes to contact the corrugation valleys of the external pipe 107 where it is welded together with these. As a result of the floating suspension of the temperature-regulating cylinder 85 through the support by way of resilient radial bearings 104 it is achieved that identical forces are applied to the hose forming the internal pipe 108 along the entire circumference of the calibrating cylinder 84, so that uniform welding with the hose forming the external pipe 107 takes place. In this described section the temperature-regulating bell 62 is still heated so that the plastic material is still in a thermally plastic condition. On its further way in the direction 4 of production in particular the hose forming the smooth internal pipe 108 is cooled down. The hose forming the external pipe 107 is equally cooled by cooling means located in the half shells 2 and 2', respectively, and not shown in the drawing.

What is claimed is:

1. An apparatus for the production of plastic pipes (23) comprising:

a plurality of half shells (2, 2) of which each is provided with a mold recess (105) and of which two at a time combine as a pair on a molding path (9) to form a mold surrounding a mold space (103) with a central longitudinal axis (29) which molding path (9) has an upstream end and a downstream end, and which half shells are arranged on a machine bed (1) to form said mold when guided in a direction (4) of production from said upstream end to said downstream end:

means for moving said half-shells (2, 2') on said machine bed (1) along said molding path (9) and from said downstream end of said molding path (9) back to said upstream end of said molding path (9):

an injection head (25) of an extruder being arranged at said upstream end of said molding path (9), the injection head (25) being provided with a line conduit (43) extending concentrically of said central longitudinal axis (29) and being surrounded by an internal mandrel (32);

a temperature-regulating bell (62) which is connected with a downstream end of the injection head (25) seen in the direction (4) of production and which temperature-regulating bell (62) is provided with a cooling channel (90) and with a line conduit (43) which is in alignment with the line conduit (43) of the injection head (25);

two supply lines connected to the cooling channel (90) and arranged in the line conduit (43) of the injection head (25) and the line conduit (43) of the temperature regulating bell (62); and wherein the supply lines are formed as flexible supply hoses (49, 50) of temperature-resistant plastic material, wherein the line conduit (43) of the injection head (25) is provided with a protecting robe (45), which accommodates the supply hoses (49, 50) and which is provided with a heat insulation towards the internal mandrel (32), and wherein the injection head (25) has a nozzle body (28) with a central chamber (44) open to said line conduit (43) of the injection head (25) to which nozzle body (28) are connected said internal mandrel (32) and an external mandrel (34) surrounding said internal mandrel (32) and an external nozzle jacket (35) surrounding the external mandrel (34); said nozzle body (28) being arranged in the direction of production upstream of said internal mandrel (32), said external mandrel (34) and said external nozzle jacket (35), wherein an internal channel (37) is provided which is defined by a channel between the internal mandrel (32) and the external mandrel (34) and by a first channel within the nozzle body (28), wherein art external channel (38) is defined by a channel between the external mandrel (34) and the external nozzle jacket (35) and by a second channel within the nozzle body (28), wherein said nozzle body (28) is provided with internal webs (41) which intersperse said first channel within said nozzle body (28), and with external webs (42) interspersing said second channel within said nozzle body (28) and which internal webs (41) and external webs (42) extend radially of the central longitudinal axis (29), and wherein at least two bores are formed in the nozzle body (28), which extend about radially of the central longitudinal axis (29) and which intersperse at least one of the internal webs (41) and at least one of the external webs (42) being in radial alignment with said at least one of the internal webs (41) and which bores open into said central chamber (44) and through two of which bores the supply hoses are piloted, and wherein within the temperature-regulating bell (62) and at least partially surrounding the line conduct (43) of the temperature-regulating bell (62) there is provided a compensation chamber (100), which is, by way of a pressure compensation channel (101), connected to another supply hose (51) in the line conduit (43) of the injection head (25)and the line conduit (43)of the temperature-regulating bell (62), and which compensation chamber (100) opens, by way of a compensation gap (102), from an outer circumference of the temperature-regulating bell (62) into the mold space (103) adjacent the injection head which injection head (25) is arranged at the upstream end of the molding path (9) and upstream of said compensation gap (102) and which another supply hose (51) is connected with the atmosphere and with said pressure compensation channel (101).

2. An apparatus according to claim 1 wherein the heat insulation is an air gap (46) between the protecting tube (45) and the internal mandrel (32).

3. An apparatus according to claim 1, wherein the temperature-regulating bell (62) is provided with a heating channel (89) arranged upstream of the cooling channel (90) seen in the direction (4) of production and wherein two further flexible supply hoses (47, 48) connected to the heating channel (89) are arranged in the line conduit (43) of the injection head (25) and the line conduit (43) of the temperature-regulating bell (62).

4. An apparatus according to claim 1, wherein the supply hoses (49, 50) consist of polytetrafluorethylene.

5. An apparatus according to claim 3, wherein the two further flexible supply hoses (47, 48) consist of polytetrafluorethylene.

6. An apparatus according to claim 1, wherein the another supply hose (51) consists of polytetrafluorethylene.

7. Apparatus according to claim 1 wherein said internal channel (37) and said external channel (38) are connected to one injection channel (39) coming from said extruder.

* * * * *

UNITED STATES PATENT AND TRADEMARK OFFICE
CERTIFICATE OF CORRECTION

PATENT NO.    : 5,511,964
DATED         : April 30, 1996
INVENTOR(S)   : Ralph-Peter Hegler, Wilhelm Hegler It is certified that error appears in the above-indentified patent and that said Letters Patent is hereby corrected as shown below:

Column 8, Line 13, delete "robe" and insert --tube--.

Signed and Sealed this

Sixteenth Day of July, 1996

BRUCE LEHMAN

*Attest:*

*Attesting Officer*       *Commissioner of Patents and Trademarks*